Aug. 15, 1939.   W. S. MACDONALD   2,169,977
CONTROL APPARATUS
Filed March 22, 1937

INVENTOR
Waldron Shapleigh Macdonald
BY
Blair, Curtis, Dunne + Hayward
ATTORNEYS Patented Aug. 15, 1939

2,169,977

UNITED STATES PATENT OFFICE 2,169,977

CONTROL APPARATUS

Waldron Shapleigh Macdonald, Foxboro, Mass., assignor to The Foxboro Company, Foxboro, Mass., a corporation of Massachusetts Application March 22, 1937, Serial No. 132,453

4 Claims. (Cl. 236—69)

This invention relates to apparatus in which the position of a movable member, such as a meter element, initiates control efforts.

An electrical temperature controller mechanism, in which movement of a galvanometer pointer with respect to a zero or null point initiates control efforts tending to restore a temperature to a desired value, might be typical of this type of control mechanism. In such apparatus movement of the galvanometer may be translated into control effort by various types of mechanism one of which is the "chopper-bar" type such as shown in the United States patent to Wilson et al. No. 1,690,517, in which a "chopper-bar" mechanism periodically clamps the galvanometer needle, measures with mechanical means the direction of the deviation of the galvanometer from the null point, and initiates a control effort tending to restore the condition to the desired value. Such an arrangement has such disadvantages for some types of control as operating only periodically and requiring precision mechanism. In another type of mechanism that has been used an electrical contact is mounted on the end of the galvanometer arm, which contact engages other stationary contacts when the arm deviates from its null position, and initiates a corrective control effect. With such an arrangement, difficulty is encountered in obtaining positive contact and in preventing the contacts from bouncing. These and other known methods have numerous disadvantages such as requiring complicated equipment, large rugged relatively insensitive galvanometers having low speed response, and introducing dead space into the control apparatus.

In the present invention, an improved control instrument is provided utilizing an improved variable condenser operated by a meter element to initiate control efforts.

It is an object of this invention, therefore, to provide improved continuously operating control mechanism utilizing a delicate movable member to initiate control efforts by varying the capacity of a variable condenser associated with the member.

Figure 1:
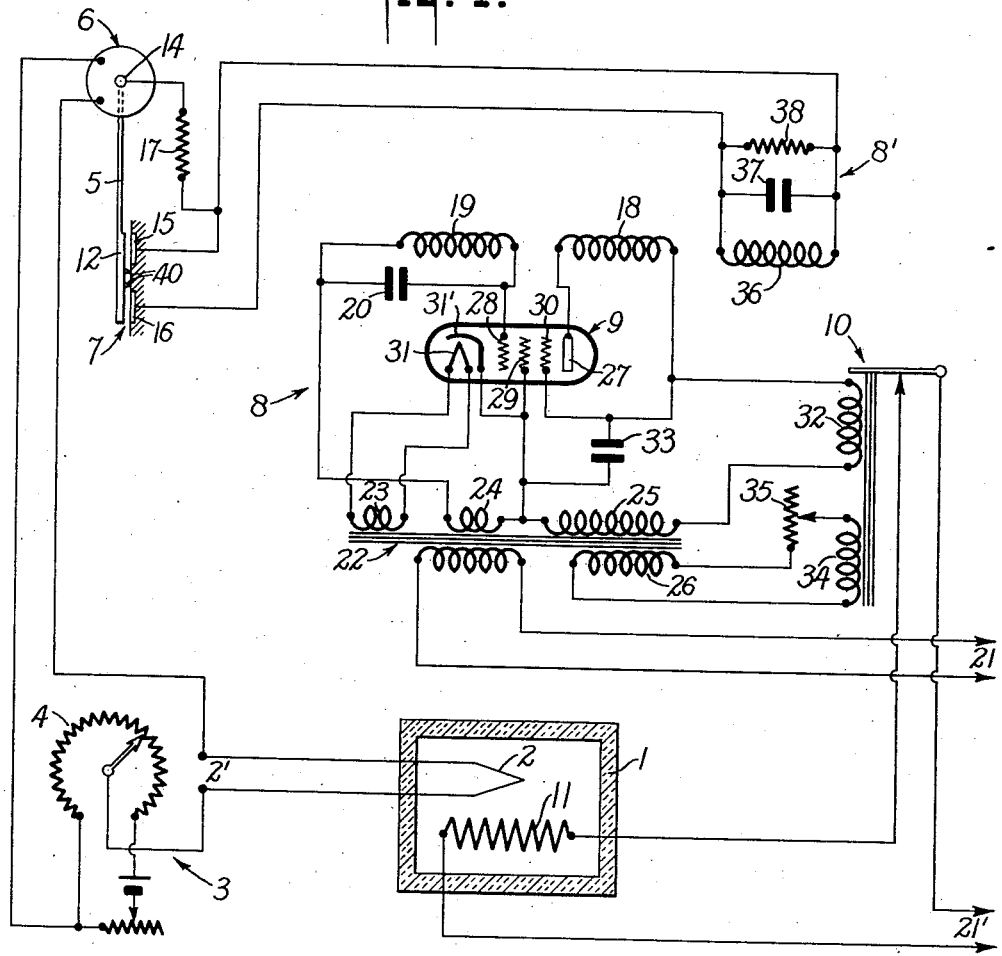
Figure 2:
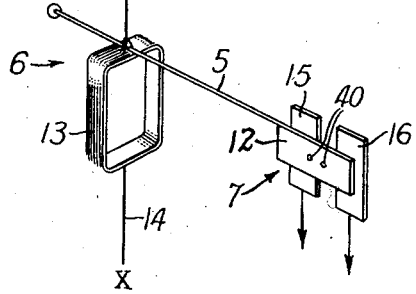

In the accompanying drawing:

Figure 1 illustrates schematically the arrangement and connections of one embodiment of my invention; and, Figure 2 shows in schematic perspective a detail of the arrangement of condenser plates with respect to a galvanometer and pointer shown in Figure 1.

Referring to Figure 1, an oven I is shown whose temperature is to be controlled. A thermocouple 2, mounted in the oven, generates a voltage proportional to the difference between the temperature existing in the oven and the temperature of the cold junction 2'. The voltage of the thermocouple 2 is opposed to the voltage of a standard potentiometer circuit (shown in simplified form at 3), the voltage of which is adjusted by means of a variable resistor 4 to a value corresponding to the voltage generated by the thermocouple 2 at the temperature at which it is desired to maintain the oven I. Differential voltage existing between the thermocouple voltage and the potentiometer voltage is manifested by movement of arm 5 of a galvanometer 6 suitably connected in the potentiometer circuit.

It is the movement of the galvanometer arm 5 with respect to a predetermined position which is used to initiate control efforts in the proper direction to maintain the temperature of the oven at the desired value. This is accomplished in the present embodiment by causing this small movement to vary the capacity of a condenser, generally indicated at 7, which is one of the components of an absorption circuit 8' coupled to an oscillator 8. Variation of the capacity of condenser 7 varies a characteristic of circuit 8' and thus of the oscillator 8 which controls a relay 10 designed to govern the flow of energy to a heater element 11 in oven 1.

As it is more clearly illustrated in Figure 2, condenser 7 is made up of a small metal plate or flag 12 attached to the galvanometer arm 5 in such a way as to lie in a plane containing the axis XX of rotation of the galvanometer 6, and two other metal plates 15 and 16 suitably mounted in a fixed position in a plane also containing the axis XX and arranged so that plate 12 approaches the plates 15 and 16 as the temperature increases. The plates 15 and 16 are connected to the absorption circuit 8'. Thus these three metal plates 12, 15 and 16 are the equivalent of two condensers connected in series, and movement of the plate 12, common to condenser 12—15 and condenser 12—16, varies the air gap in both condensers simultaneously in the same direction, thereby similarly varying their capacity. This arrangement is advantageous in that an increasingly rapid change of their combined capacity occurs as the plate 12 more closely approaches plates 15 and 16. A thin sheet of mica or other dielectric may be provided between plate 12 and plates 15 and 16 to prevent electrical contact therebetween.

The condenser 7 is made a portion of the absorption tank circuit 8' which comprises, in addition to condenser 7, a coil 36, a fixed condenser 37 and a resistor 38. Variation of the capacity of condenser 7 tunes this circuit 8', and the constants of this circuit are so chosen that for some value of condenser 7 it is tuned to the frequency of the oscillator 8.

The oscillator 8 may be of any suitable type, and in the embodiment herein described is of the well-known, self-excited, tickler-feedback type, using the mutual inductance of two coils to feed back the alternating current impulses from the plate circuit to the grid circuit. To accomplish this, a plate circuit coil 18 is coupled to a resonant tank circuit coil 19 in the grid circuit which circuit is tuned to a desired oscillation frequency by a condenser 20. A standard five element tube 9 having, beside the usual cathode 31', anode 27 and control grid 28, a suppressor grid 29 and a screen grid 30, is used in the oscillator circuit. The use of a vacuum tube provided with these additional grids gives greater frequency stability and greater power output than that given by a triode of comparative size.

Unrectified alternating current power is supplied from a suitable supply line 21 through a transformer 22 to the oscillator 8. The transformer 22 is provided with a plurality of secondary windings 23, 24, 25 and 26 which provide heater current for the cathode heater 31, grid bias potential, plate potential, and a relay bias potential, respectively.

The plate current of the oscillator tube 9 flows through a coil 32 of the relay 10. The relay 10 is also provided with a second coil 34 wound on the same core and connected to transformer winding 26 through a variable resistance 35, whereby the relay 10 may be magnetically biased to trip at any value of plate current desired, by adjustment of the resistor 35. The relay coil 32 and the transformer secondary winding 25 are by-passed for high frequency by a condenser 33.

The absorption tank circuit 8' is inductively coupled by coil 36 to the plate and grid coils 18 and 19, respectively, of oscillator 8. A small variation of condenser 7 tunes this absorption circuit 8' to or away from the frequency of the oscillator 8, thereby causing the effective load on the oscillator to increase or decrease dependent upon the capacity of condenser 7.

In the embodiment of the invention herein described, condenser 37 of the absorption circuit 8' is adjusted so as to cause condenser 7 to tune this circuit to the oscillation frequency when its capacity is approximately maximum, i. e. when plate 12 on galvanometer arm 5 is close to the position of the stationary plates 15 and 16, thus causing circuit 8' to absorb the power generated by oscillator 8, and thus decreasing the magnitude of the oscillations whereby a relatively large decrease in the plate current of oscillator tube 9 occurs, initiating a control effort which, in the present embodiment, consists in deenergizing relay 10 to open the circuit supplying energy to heater 11 in oven 1. Condenser 37 may be adjusted so that condenser 7 is at approximately its minimum capacity when the absorption circuit 8' is in resonance with oscillator 8. With this arrangement, relay 10 is designed to have its contacts open when it is energized because the plate current will increase as plate 12 approaches plates 15 and 16. Under certain conditions it may be desirable to choose the constants of the oscillator 8 and tank circuit 8' so that the circuit 8' will absorb sufficient power from the oscillator 8 to cause the plate current to increase as the tank circuit is tuned to the frequency of the oscillator.

Resistance 38 is shunted across the absorption tank circuit 8' to increase its loss characteristic, and thereby to control the sharpness of its resonance curve, in order to improve the stability of the controller, but, because of the high oscillation frequency used, this does not affect disadvantageously the sensitivity of the control accomplished. The use of this absorption tank circuit permits the controlling condenser 7 to be isolated from the oscillator circuit and insulated from the high voltage of the oscillator plate circuit.

In the present embodiment which is particularly adapted to a commercial instrument, the size and weight of the parts including the coils and condensers are preferably kept small so that the controller is compact. Furthermore, as above described, the relative values of the parts are preferably such that the resulting instrument is one in which the setting of the control point is not disadvantageously effected by such external factors as line voltage variation and temperature change and which may be supplied with unrectified A. C. power.

One satisfactory embodiment of the invention having the above described characteristics operates at a frequency in the neighborhood of 20 megacycles. This instrument, operating at this frequency which might be considered a relatively high frequency, gave a large change in the resonance frequency of the absorption tank circuit with a small relative movement of small condenser plates. Thus, although only a light load was placed on the galvanometer 6, the sensitivity of the controller was not impaired. Further, this instrument may be so adjusted that the "dead-space" of the movement of the plate 12 on the arm 5 is small, i. e. so that movement of the plate about a thousandth of an inch or less changes the control effect.

Plate 12 of condenser 7 is electrically connected to the absorption circuit 8' through galvanometer arm 5, the galvanometer suspension 14, and a high resistance 17 to plate 15. Such a connection provides a leakage path which prevents accumulation of charges on plate 12, due to such causes as mechanical rectification, etc., which charges might cause plate 12 to stick to plates 15 and 16 and interfere with the operation of the apparatus. Several small points 40, perpendicular to the plates, may be provided therebetween as additional insurance against sticking.

It is desirable to enclose galvanometer 6, with its accompanying condenser plates 12, 15, and 16, to protect them from air currents which might cause inadvertent movement of the arm 5. The galvanometer assembly, thus protected from interference by air currents, is relatively insensitive to vibration, due to the air damping action of the condenser plate 12. When this plate is in its normal operating position within several thousandths of an inch of the plates 15 and 16, an air cushion or a semi-vacuum effect is created by movement of the plate 12 toward or away, respectively, from plates 15 and 16, which tends to counteract such movement and thus increase the damping thereby overcoming to a considerable extent the effect of extraneous vibrations on the instrument.

As many embodiments may be made of the above invention, and as many changes might be made in the embodiment above described, it is to be understood that all matter hereinbefore set forth or shown in the accompanying drawing is to be interpreted as illustrative only and not in a limiting sense.

I claim:

1. In apparatus for controlling the value of a condition of the type having a condition sensitive means, a member adapted to be moved in a path by said condition sensitive means, a condenser whose capacity varies in response to movement of said member, and electrical means responsive to variations in the capacity of said condenser for exerting control efforts responsive to changes of said condition, said condenser comprising a first condenser plate mounted on said movable member in a plane approximately perpendicular to the path of motion of said member, and second and third condenser plates mounted in a plane parallel to the plane of said first plate and in capacitive relation therewith whereby movement of said first condenser plate relative to said second and third condenser plates alters the electrical capacity between said second and third condenser plates.

2. In apparatus for controlling the value of a condition of the type having a condition sensitive means, a member movable in a path by said condition sensitive means, a condenser whose capacity varies in response to movement of said member, and electrical means responsive to variations in the capacity of said condenser for exerting control efforts responsive to changes of said condition, said condenser comprising a first condenser plate mounted on said movable member in a plane approximately perpendicular to the path of motion of said member, second and third condenser plates mounted in a plane parallel to the plane of said first plate and in capacity relation therewith whereby movement of said first condenser plate relative to said second and third condenser plates alters the electrical capacity between said second and third condenser plates, and a high resistance connected between said first and second plates to prevent the accumulation of electrical charges thereon.

3. In apparatus for controlling the value of a condition of the type having a condition sensitive means, a member movable in a path by said condition sensitive means, a condenser whose capacity varies in response to movement of said member, and electrical means responsive to variations in the capacity of said condenser for exerting control efforts responsive to changes of said condition, said condenser comprising a first condenser plate mounted on said movable member in a plane approximately perpendicular to the path of motion of said member, second and third condenser plates mounted in a plane parallel to the plane of said first plate and in capacitive relation therewith whereby movement of said first condenser plate relative to said second and third condenser plates alters the electrical capacity between said second and third condenser plates, and at least one projection on one of said planes extending toward the other of said planes to prevent the opposing condenser plates from sticking together.

4. In control apparatus of the class described, including a condition sensitive means, a member movable in a path by said condition sensitive means, control means for affecting the value of said condition, electrical means for regulating said control means including a variable condenser the capacity of which is varied by movement of said member, said condenser comprising a first condenser plate mounted on said movable member in a plane approximately perpendicular to the path of motion of said member, and second and third condenser plates connected to said electrical means and mounted in a plane parallel to the plane of said first condenser plate and in capacitive relation therewith whereby movement of said first condenser plate relative to said second and third condenser plates alters the electrical capacity between said second and third condenser plates.

WALDRON SHAPLEIGH MACDONALD.